Patented Apr. 5, 1938

2,112,847

UNITED STATES PATENT OFFICE 2,112,847

TREATMENT OF HYDROCARBONS

Vladimir Ipatieff and Herman Pines, Chicago, Ill., assignors to Universal Oil Products Company, Chicago, Ill., a corporation of Delaware No Drawing. Application May 1, 1937, Serial No. 140,164

6 Claims. (Cl. 260—169)

This invention relates particularly to the treatment of paraffin hydrocarbons which are gaseous at ordinary temperatures and pressures, and particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process which is operated principally with the object of producing gasoline from heavier and less valuable petroleum fractions incidentally produces considerable yields of fixed gases comprising hydrogen, methane, ethane, propane, and butanes as well as ethylene, propylene, and butylenes in varying quantities and proportions. In most instances, these gases are considered to have merely a fuel value though attempts are made from time to time to utilize the olefinic constituents for the manufacture of hydrocarbon derivatives on a commercial basis.

In one application of the present process the isobutane and propylene present in cracked gas mixtures are utilized as a source of additional yields of motor fuel fractions to augment those primarily produced by the cracking operation. While the process is particularly applicable to the utilization of the hydrocarbons in cracked gas mixtures, and particularly selected fractions produced therefrom in the stabilizers of cracking plants, it is also applicable to the treatment of isobutane and propylene produced from any other source.

In one specific embodiment the present invention comprises the alkylation of isobutane with propylene at temperatures of 0° C. or below with catalysts comprising aluminum chloride and hydrogen chloride.

In a preferred embodiment of the invention the desired alkylation reactions are activated or accelerated by the presence of small quantities of olefins more reactive than propylene which may be added continuously during a run or used to treat the catalyst prior to its use in the alkylation reactions with propylene. This point will be developed in greater detail in a later portion of the specification.

An essential feature of the present invention is the utilization of sufficiently low temperatures of treatment so that the ordinarily vigorous action of aluminum chloride in catalyzing condensation reactions among hydrocarbons is moderated and reactions of alkylation occur rather than simple polymerization of the olefin involved. In other words, at the selected low temperatures employed the rate of the polymerization reactions is reduced while apparently the rate of the alkylation reactions is not reduced to the same extent so that alkylation takes place in preference to polymerization.

The total reactions occurring when isobutane is alkylated with an olefin such as propylene within the preferred range of conditions will necessarily involve to some extent not only simple alkylation corresponding to the addition of one or more molecules of the olefin to the isoparaffin but also some reaction of polymerization and some reactions of decomposition, so that the net result is the production of a mixture of hydrocarbons having a considerable boiling range but containing a major proportion of mono- and di-alkylated products as will be shown in a later example.

The actual operation of the process admits of some modification depending upon the normal phase of the reacting constituents and whether batch or continuous operations are employed. In a simple type of batch operation involving substantially only the pure compounds isobutane and propylene the isobutane is cooled to a temperature of 0° C. or below in the presence of a minor percentage of anhydrous aluminum chloride and alkylation is effected by the gradual introduction of propylene under the surface of the liquid which may be mechanically stirred to prevent subsidence of the solid aluminum chloride particles. A small percentage of hydrogen chloride is preferably admitted along with the stream of olefin vapor, and for effecting more rapid and complete alkylation it is best practice to add also a small percentage of a more reactive olefin such as, for example, isobutylene or normal butylenes. After a treatment is completed the aluminum chloride layer is allowed to settle, and the upper hydrocarbon layer is removed by decantation and subjected to fractionation for the removal of uncombined hydrocarbons as a light overhead and the recovery of an intermediate motor fuel fraction.

In continuous operation liquid isobutane containing suspended therein the requisite amount of aluminum chloride and cooled to a suitably low temperature may be pumped through a tubular treater at the entrance to which it receives the necessary addition of propylene and hydrogen chloride, the desired alkylation taking place during passage through the treater and the fractionation of the products being accomplished in a subsequent fractionator. The details of continuous process of this general character are more or less familiar to those skilled in oil refinery operations and any necessary addition to or modifications of the above general procedures will be more or less obvious, and can be made without departing from the general scope of the invention.

The preliminary activation of the alkylation reaction may be effected by treating the granular aluminum chloride intended for use in the reactions with either normal or isobutylenes by passing a limited amount of these compounds in liquid-phase in contact with the granular material during vigorous agitation. The pronounced effect of this activation upon the speed of subsequent alkylation reactions with propylene is somewhat difficult to explain on a theoretical basis though it may be suggested that intermediate addition compounds are formed which are the real catalysts of the reaction in the presence of the hydrogen chloride which is continuously added. It is further possible that a certain amount of more reactive olefin which is combined with the aluminum chloride tends to alkylate the isobutane and evolve considerable energy of reaction which has the effect of energizing the less reactive propylene. It has been observed that the activating effect is gradually lost so that in a strict sense it is not entirely catalytic. This feature of the present process is important from a practical standpoint since, when using pure propylene or at least propylene free from other olefins, the speed of the alkylation reactions is sometimes below a practical level at the temperatures necessary to prevent polymerization. The preliminary treatment of granular aluminum chloride with relatively highly reactive olefins, such as isobutylene or normal butylenes, has been observed to have a still further effect of practical significance, in that there is a greatly decreased tendency for the chloride particles to become very finely divided under vigorous agitation but rather to maintain their original size, which prevents the carrying off of the catalyst in colloidal suspension in continuous processes.

The reacting hydrocarbons required for the present process may be obtained from any convenient source. As a rule the best sources are the cracked gas mixtures produced in the pyrolysis of heavy oils with the primary object of producing gasoline. The technique of hydrocarbon fractionation is sufficiently developed at the present time so that it is commercially feasible to produce relatively pure propylene and isobutane. A method which may be employed to obtain propylene which is not contaminated with paraffin hydrocarbons consists in the use of solvents which selectively abstract olefins from the gas mixtures, which olefins are then separately fractionated. In such a process the residual unabsorbed paraffin mixture may be employed as the source of the required isobutane. Propylene may also be prepared by the selective catalytic dehydrogenation of propane or propane fractions.

Over the preferred low temperature conditions of operation and in the presence of an excess of isobutane, one molecule of propylene tends to react with its molecular equivalent of isobutane while the excess of isobutane remains unaffected. When more propylene is used than corresponds to about one mole of propylene to three moles of isobutane there is an increased tendency for polymerization reactions to occur in preference to alkylation reactions. This is to be expected to some extent on account of the readiness with which propylene alone is polymerized by aluminum chloride. However, by maintaining the proper excess of the paraffin hydrocarbon the course of the reactions may be kept principally in the direction of production of alkylated products of a saturated rather than an olefinic character. In order to balance up any disproportion on the side of either the olefin or the paraffin, to produce products of the desired degree of alkylation either may be added from outside sources to produce a mixture of proper proportions. It will be shown in subsequent examples that there is some production of isodecanes as well as isoheptanes, the former compounds corresponding to alkylation of isobutane by two isopropyl groups.

The process may be utilized for the direct improvement of low antiknock value gasolines by suspending aluminum chloride therein at the required low temperatures and passing a proportioned mixture of isobutane and propylene into the suspension along with a trace of hydrogen chloride. The gasoline functions both as a solvent and a reaction medium and the alkylation products are formed and blended with the gasoline at the same time to increase its antiknock value to an extent depending upon the amount of alkylated products formed.

The following examples are given as illustrative of the type of results normally obtainable by the use of the present process, although it is not given with the intention of limiting the scope of the invention in exact conformity with the data presented.

*Example I*

Granular anhydrous aluminum chloride was placed in a reaction vessel which was cooled to a temperature of −30° C. To activate this material a total of two parts by weight of an equal mixture of isobutane and isobutylene was contacted with the material. Leaving the activating hydrocarbon mixture in place the liquid mixture of isobutane and propylene was contacted in such a way that the charge entered below the surface of the hydrocarbon liquid containing the suspended aluminum chloride while reaction products were siphoned from the reaction vessel at a sufficiently high level to avoid removal of the catalyst particles. The charge consisted of approximately 77 per cent of isobutane and 23 per cent of propylene, calculated on a gas basis, and a steady feed of a small amount of hydrogen chloride was maintained during the run.

3250 volumes of isobutane-propylene mixture produced 650 volumes of liquids boiling within the ordinary range of commercial gasoline or up to approximately 225° C. 90% of the total liquid products boiled below 220° C. and the octane number of this gasoline fraction was 81 when tested by the motor method. Careful fractionation indicated that 42% of the total liquid products consisted of isoheptanes boiling between 88 and 90° C. and another 20 percent of the liquid products corresponded to isodecanes boiling between 150 and 154° C.

*Example II*

A run was made at the upper limit of temperature corresponding to the economical and practical operation of the process. The general procedure was the same as in Example I in regard to the relative proportions of the hydrocarbons reacted in the presence of aluminum chloride. In this case, however, 3000 volumes of isobutane-propylene mixture produced 600 volumes of liquids boiling up to 220° C., 92% of which boiled below 200° C. The octane number of the 200° C. end point fraction was 83 by the motor method and it was noted that there was a somewhat higher percentage of material boiling below the 50% point in the distillation test. In comparison with the first case, a careful fractionation showed that 39% of the total liquid products consisted of isoheptanes instead of 42% as in the first example.

The foregoing specification has disclosed the character and scope of the present invention and the examples have shown its practical aspects but neither section is to be considered as unduly limiting.

This application is a continuation-in-part of our co-pending application Serial No. 103,389, filed September 30, 1936.

We claim as our invention:

1. A process for the production of alkyl derivatives of isobutane which comprises subjecting said isobutane to the action of propylene in the presence of aluminum chloride and hydrogen chloride at a temperature of 0° C. or below.

2. A process for the production of alkyl derivatives of isobutane which comprises subjecting said isobutane to the action of propylene in the presence of aluminum chloride and hydrogen chloride at temperatures within the range of 0° C. to −50° C.

3. A process for the production of alkyl derivatives of isobutane which comprises subjecting said isobutane to the action of propylene and a minor proportion of a more reactive olefin in the presence of aluminum chloride and hydrogen chloride at a temperature of 0° C. or below.

4. A process for the production of alkyl derivatives of isobutane which comprises subjecting said isobutane to the action of propylene and a minor proportion of a butylene in the presence of aluminum chloride and hydrogen chloride at a temperature of 0° C. or below.

5. A process for the production of alkyl derivatives of isobutane which comprises subjecting said isobutane to the action of propylene and a minor proportion of a normal butylene in the presence of aluminum chloride and hydrogen chloride at a temperature of 0° C. or below.

6. A process for the production of alkyl derivatives of isobutane which comprises subjecting said isobutane to the action of propylene and a minor proportion of isobutylene in the presence of aluminum chloride and hydrogen chloride at a temperature of 0° C, or below.

VLADIMIR IPATIEFF.
HERMAN PINES.